No. 650,712. Patented May 29, 1900.
J. G. EDDY.
TAPE MEASURE.
(Application filed Mar. 6, 1900.)
(No Model.)
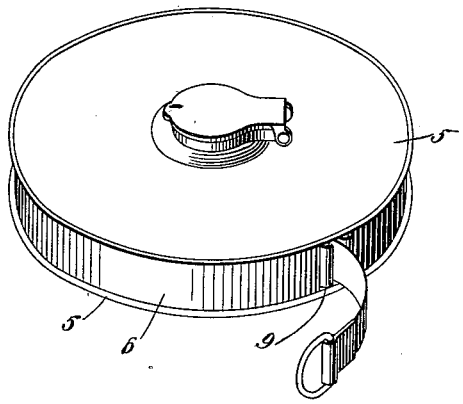
Fig. 1,
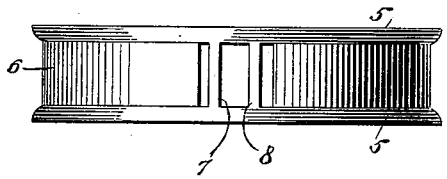
Fig. 2,
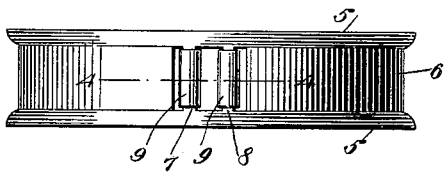
Fig. 3,
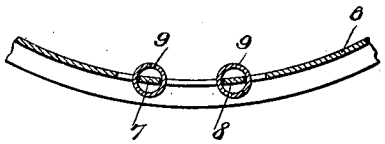
Fig. 4.
WITNESSES:
Edward Thorpe
INVENTOR
John G. Eddy
BY
ATTORNEYS

UNITED STATES PATENT OFFICE.

JOHN G. EDDY, OF NEW YORK, N. Y.

TAPE-MEASURE.

SPECIFICATION forming part of Letters Patent No. 650,712, dated May 29, 1900.

Application filed March 6, 1900. Serial No. 7,492. (No model.)

*To all whom it may concern:*

Be it known that I, JOHN G. EDDY, a citizen of the United States, and a resident of the city of New York, borough of Brooklyn, in the county of Kings and State of New York, have invented a new and Improved Tape-Line Casing, of which the following is a full, clear, and exact description.

This invention relates particularly to improvements in the bearings for guide-rollers mounted in the rim of a tape-line case; and the object is to construct the bearings integral with and on the general surface plane of the rim, so that the same may be formed during the operation of forming the rim, thus materially reducing the cost of manufacture, and, further, by so forming the bearings that there are no projections at the sides of the case, as is the result when pins are used for the bearings, the said pins passing through the sides and being headed, which heads are apt to become worn and cause damage to a person's hand or pocket.

I will describe a tape-line casing embodying my invention and then point out the novel features in the appended claim.

Reference is to be had to the accompanying drawings, forming a part of this specification, in which similar characters of reference indicate corresponding parts in all the figures.

Figure 1 is a perspective view of a tape-line casing embodying my invention. Fig. 2 is a view of the rim with the guide-rollers removed. Fig. 3 is a view of the rim, showing the guide-rollers in place; and Fig. 4 is a section on the line 4 4 of Fig. 3.

The casing comprises the side pieces 5 and the rim 6, secured together in the usual manner. Formed in the rim are cross-pieces or bearings 7 8 for the bearing-rollers. These bearings are made integral with the rim and have their outer surfaces flush or on a plane with the outer surface of the rim. The guide-rollers 9 are made in tubular form, but are split or open longitudinally at one side, so that when this opening is spread sufficiently apart the rollers may be passed over the bearings, after which the rollers may be pinched together.

It will be noted that there are no projections at the outer sides of the casing, as in devices where pivot-pins are used and passed through the side portions.

Having thus described my invention, I claim as new and desire to secure by Letters Patent—

In a tape-line casing, the combination with a rim having cross-bars formed integral therewith, the outer surfaces of said cross-bars being on a plane with the outer surface of the rim, of tubular guide-rollers, the said cross-bars serving as bearings for said guide-rollers, substantially as specified.

In testimony whereof I have signed my name to this specification in the presence of two subscribing witnesses.

JOHN G. EDDY.

Witnesses:
WILLIAM H. EDDY,
WILLIAM P. EDDY.